April 14, 1970 W. L. SHEVEL, JR., ETAL 3,506,972

FERRITE CORE ASSEMBLY FOR MAGNETIC STORAGE DEVICES

Original Filed Dec. 13, 1961 2 Sheets-Sheet 1

1

3,506,972
FERRITE CORE ASSEMBLY FOR MAGNETIC STORAGE DEVICES

Wilbert L. Shevel, Jr., Peekskill, Otto A. Gutwin, Crugers, and Kurt R. Grebe, Beacon, N.Y., assignors to International Business Machines Corporation, New York, N.Y., a corporation of New York Original application Dec. 13, 1961, Ser. No. 159,127, now Patent No. 3,237,283, dated Mar. 1, 1966. Divided and this application May 5, 1965, Ser. No. 462,780
Int. Cl. G11c *5/02, 11/02;* C04b *37/00*
U.S. Cl. 340—174 2 Claims

ABSTRACT OF THE DISCLOSURE

A ferrite core assembly formed from a series of extruded, tubular, ferrite elements arranged in parallel alignment which are bonded to a second series of extruded, tubular, ferrite elements overlaying said first series of elements wherein the bond between the first and second series of elements is a magnetic crystalline ferrite bond.

This is a division of application Ser. No. 159,127 filed Dec. 13, 1961, now U.S. Patent 3,237,283.

This invention relates to an electromagetic core assembly and to a process for making such an assembly. More specifically, the invention is directed to the production of a ferrite core assembly comprising a plurality of tubular ferrite components arranged in a coordinate array.

Magnetic core matrices are basic components of data processing apparatus. Their main function is to store digital data. Cores of the well known rectangular hysteresis loop type are basic components of such matrices. It is desirable that the cores have optimum switching characteristics so that the operation of the matrix is both fast and reliable. Efforts to increase the switching speeds of such cores have usually resulted in an increased cost of fabrication.

One important parameter to be considered in achieving a desired switching time is the cross-sectional area of the individual core members. The smaller the cross-sectional area of the core, the smaller is the total flux switched, but at the same time the cost of fabrication and the difficulty of threading and packaging such cores increases with decrease in size.

According to the prior art, ferrite core assemblies have been produced which incorporate a plurality of extruded ferrite core elements aligned and mounted on a support of non-magnetizable material. Even when using extruded, ring-shaped core elements of substantial cross-sectional area, the handling, aligning, mounting and threading of the elements is a difficult and expensive matter. Where the attempt is made to improve the performance of the assembly by utilizing cores of smaller cross-sectional area, the task of assembling the array becomes increasingly tedious and costly.

In accordance with the present invention, the cross-sectional area of the cores may be materially reduced without a concurrent increase in the cost of fabrication or difficulty of handling. Thus, the production of a low-cost ferrite array which is easily handled and which has optimum switching characteristics is a major object of the present invention.

More specifically, it is an object of this invention to produce magnetic core matrices employing rectangular hysteresis loop cores of very small cross-sectional area without accompanying fabrication and handling difficulties and expense.

It is a further object of this invention to produce matrices which are unique in structure, reliable in operation,

2 easy to produce and handle and extremely fast with respect to switching time.

It will also be apparent that the present invention has for its object the production of a ferrite memory array in a manner which readily lends itself to continuous batch fabrication techniques with full use of automated devices, both in the production of the array and in subsequent wiring and handling.

The invention also has for its object the production of a ferrite memory array having high bit density, as well as the other desirable characteristics inherent in the cores of the extruded toroidal type.

The method for constructing ferrite core assemblies in accordance with the present invention broadly comprises the steps of extruding tubular members of ferrite material, assembling overlaying tiers comprising a plurality of tube segments in the desired assembly and firing the assembly to produce an integral structure.

The foregoing and other objects, features and advantages of the invention will be apparent from the following description of the invention as illustrated in the accompanying drawings.

In preparing a ferrite core assembly according to the invention, the first general step is the extrusion of tubular ferrite core elements. This is accomplished by preparing ferrite powder, mixing the powder with a suitable binder to form an extrudable plastic mass and then die expressing this mass into tubular form. A plurality of tubular elements may be simultaneously extruded through a multiple die device or a single extrusion may be cut into lengths providing the required number of tubular elements.

The tubes are relatively fragile when first extruded and so it is desirable, although not essential, to permit the green tubes to cure in air until their strength increases to the point at which they can be handled without danger of fracture or distortion.

Figures 1, 2, 3:
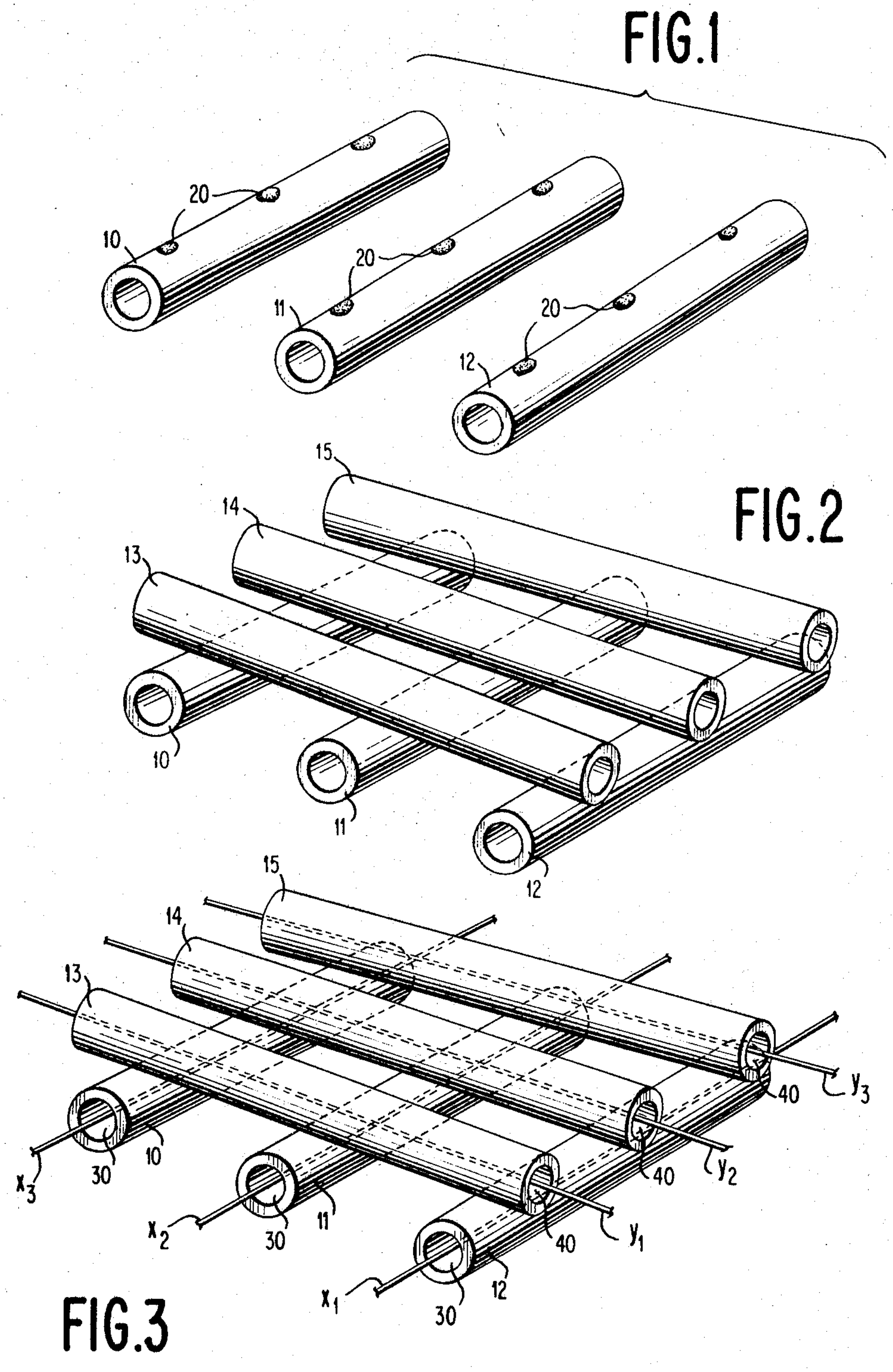
FIG. 1 is a perspective view of a partially assembled array in accordance with the invention.
FIG. 2 is a completed structure.
FIG. 3 is a completed structure including threaded drive wires.

Next, as shown in FIG. 1 of the drawing, a series of tubular segments are placed side by side with their longitudinal axes parallel to one another and with a predetermined distance between their respective aperture centers.

A second series or tier of parallel hollow ferrite tubes is then placed on top of the first tier of tubes, as shown in FIG. 2 of the drawing, making a single point of contact between the side surfaces of each tube in the first series and each tube in the second series. The longitudinal axes of the tubes in the second tier are also parallel to one another, but are set at an angle, for instance 90°, with respect to the longitudinal axes of the tubes in the lower tier.

The assembly is then fired or sintered in a furnace to produce intercrystalline growth and bonding at the points of contact between the tubes in the first and second tiers. Upon cooling an integral structure is obtained which may be trimmed and threaded for use as a core assembly.

The invention including the foregoing general process and the products obtained according to the process will perhaps be better understood with reference to the fol lowing detailed example which constitutes a preferred embodiment of the invention and the best mode that has been contemplated for carrying it out.

In preparing the ferrite material for extrusion, a ferrite powder is first obtained and this is then mixed with an organic binder and low boiling solvents to produce the desired extrusion mixture.

In producing the ferrite powder, the following materials are mixed in a ball mill for about four hours:

924 grams $Fe_2O_3$
980 grams $MnCO_3$
34.68 grams $Cr_2O_3$
23.31 grams NiO
4,000 cc. methyl alcohol.

After ball milling, the mixture is dried under a heat lamp and calcined at 850° C. for one hour in air. The calcined powder is then subjected to an additional ball milling to break up large sintered particles produced in the previous step and to generally reduce the particle size.

An additional 3,200 cc. of methyl alcohol is then added to the calcined powder and the mixture is ball milled for approximately forty-eight hours. The mixture is then screened through a 320 mesh screen and is dried under a heat lamp.

The ferrite powder produced according to the previous steps is then mixed with organic binder material and low boiling solvents in approximately the following proportions to produce a favorable consistency for extrusion:

20 grams ferrite powder ($Fe_{1.7}Mn_{1.2}Cr_{0.06}NiO_{.05}$) from the preceding steps
3 grams unfilled glyptol varnish
1 gram A–20 (7.5% ethyl cellulose and 92.5% pine oil)
4 grams diethyl ether.

The above mixture of ferrite powder, binder and low boiling solvents is then milled for fifteen minutes in a "Spek Mixer Mill." A pug mill may also be used satisfactorily for this mixing step. During this mixing some of the solvents present may be evaporated, but this does not adversely affect the process or extruded products. When the fifteen-minute milling period has been completed, it is observed that the extrusion mixture has a tacky but not a sticky consistency and is characterized by the proper plastic flow in the extrusion device.

The ferrite extrusion mix is then loaded into the hopper of the extrusion device and hollow tubes of ferriate material are extruded through the die. A pressure of from ten to twenty-five pounds is maintained on the extrusion mix and an extrusion rate of from six to twelve inches per minute is also maintained.

The dimensions of the green extruded tubes are OD 0.25 inch, ID 0.15 inch and length approximately four inches.

The extruded hollow ferrite tubes are then air cured for approximately twenty-four hours in order to increase their green strength so that they may be handled without danger of breaking or dimensional alteration.

After the green tubes have been air cured, they are in a condition for assembly. A series or tier of the tubes is then arranged in a plane with their longitudinal axes parallel and with a predetermined distance between the axes.

Referring to FIG. 1 of the drawing, a series of three hollow ferrite tubes 10, 11 and 12 are shown in position at this stage of the assembly.

The spacing of the tubes, the number of the tubes, the physical dimensions of the tubes and the chemical composition of the ferrite material all are selected in accordance with the requirements of the final core assembly.

Next, cement is applied to the tubes as arranged in FIG. 2 of the drawing. It is immaterial whether the cement is applied to the tubes prior to or after their arrangement in this position.

In the preferred embodiment a ferrite cement having the following composition is applied in beads 20 along the upper surface of the tubes as shown in FIG. 2;

9 grams ferrite powder as prepared above
3 grams A–120 (7.5% ethyl cellulose and 92.5% pine oil)
1 gram unfilled glyptol varnish
1 gram pine oil.

Next, a second tier of hollow ferrite tubes 12, 14 and 15 is arranged on top of the first tier with their longitudinal axes in parallel alignment and with their axes spaced apart a predetermined distance. The longitudinal axes of the tubes in the second tier are set at an angle with respect to the longitudinal axes of the tubes in the first tier. The second tier of tubes is placed in contact with the beads of cement 20 applied to the upper surfaces of the tubes 10, 11 and 12 of the lower tier. The cement 20 redissolves the skin of the tubes in the regions of contact and becomes an integral part of the tubes so as to form a preliminary bond between the tubes of the first and second tiers at their points of contact.

A cement-bonded assembly as shown in FIG. 2 of the drawing is produced by the foregoing step and is air cured to set the cement by heating in an oven at 120–150° C. for three hours. The cement may also be cured at room temperature, requiring a longer period of time to set.

As shown in FIG. 3, the angle between the tubes in the upper tier and the tubes in the lower tier is approximately 90°, but this is not critical. Other angular relationships may be worked out consistent with the desired characteristics of the particular assembly. Likewise, the number of tubes in each tier and the number of tiers in the assembly is not limited to the arrangement shown in the drawing.

After the cement is cured, the assembly is fired, best results being obtained by placing the assembly in a furnace and gradually raising the temperature from ambient to 1,000° C. over a ten-hour period. During this treatment the binder material of the extrusion mix is volatilized and the structure is pre-sintered. Without cooling the assembly is then fired at 1,200° C. for approximately two hours. The assembly is cooled in the furnace to 950° C. and is then quenched in air.

The firing schedule can be adjusted to suit the composition of the material being treated and the properties desired in the final product.

After the firing and sintering operations are completed, the tube ends may be trimmed, if needed, although this operation may be avoided by a preliminary trimming of the tubes while still green, i.e., before sintering.

The finished core assembly may then be wired as illustrated in FIG. 3. A plurality of drive lines $X_1$, $X_2$, $X_3$ are threaded through the hollow cores 30 of lower tier tubes 10, 11 and 12 and a plurality of drive lines $Y_1$, $Y_2$, $Y_3$ are threaded through hollow cores 40 of upper tier tubes 13, 14 and 15. The drive lines may be held in place in the tubes by any suitable means, such as insulating cement, a bracket inserted in the mouth of the tube, or the like.

Figure 4:
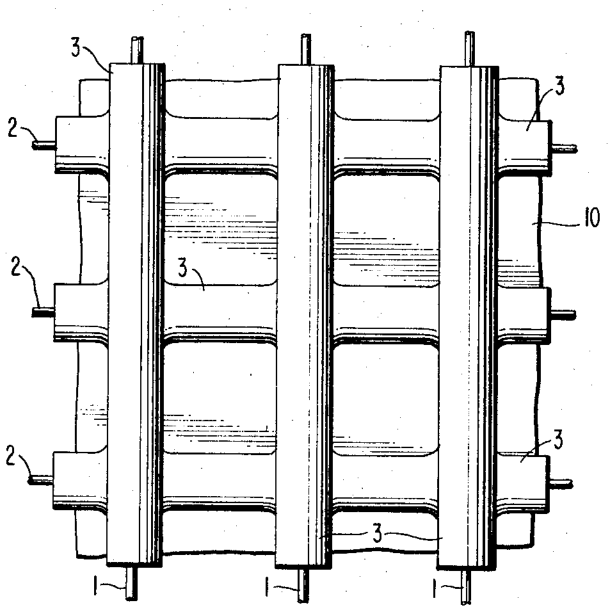
FIG. 4 is a top plan view of a sintered connected array of ferrite magnetic material having wire conductors in different planes which is assembled on a non-magnetizable support plate.
Figure 5:
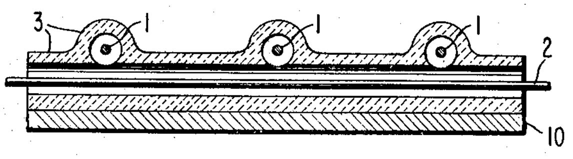
FIGURE 5 is a cross sectional view showing the structure of the intersection of a ceramic ferrite magnetic material and the position of a conducting wire which is assembled on a non-magnetizable support plate.

As a further variation, the assembly produced according to the present invention may be integrally mounted upon a non-magnetizable support plate as shown in FIGS. 4 and 5 by numeral 10. Such mounting is desirable in certain uses of the assembly. Several mounted or unsupported core assemblies may also be combined to form larger assemblies as needed.

The tubes have been shown in substantially parallel alignment in the drawing. Although this is the most practical arrangement to produce orderly junctions and uniform spacing, arrays may also be produced with the tubes in non-parallel alignment.

While the invention has been particularly shown and described with reference to a preferred embodiment thereof, it will be understood by those skilled in the art that many changes in form and detail may be made therein without departing from the spirit and scope of the invention.

What is claimed is:

1. A ferrite core assembly comprising a series of extruded tubular, ferrite elements arranged in parallel alignment, a second series of extruded, tubular, ferrite elements arranged in side by side relationship and having the longitudinal axes of the elements in parallel alignment, a crystalline ferrite bond between each of the elements in said first series and each of the elements in said second series.

2. A ferrite core assembly comprising a non-magnetizable support plate, a series of extruded tubular ferrite elements integrally mounted on said support plate in parallel alignment, a second series of extruded ferrite elements overlaying said first series and also in parallel alignment, and a crystalline ferrite bond between each element of said first series and each element of said second series.

References Cited

UNITED STATES PATENTS

| | | | |
|---|---|---|---|
| 3,100,295 | 8/1963 | Schweizerhof | 340—174 |
| 2,970,905 | 2/1961 | Doll | 75—208 |

FOREIGN PATENTS

| | | |
|---|---|---|
| 551,211 | 2/1943 | Great Britain. |
| 121,008 | 2/1946 | Australia. |

JAMES W. MOFFITT, Primary Examiner

U.S. Cl. X.R.

156—89, 182

UNITED STATES PATENT OFFICE
CERTIFICATE OF CORRECTION

Patent No. 3,506,972 Dated April 14, 1970

Inventor(s) W. L. Shevel, Jr.; Otto A. Gutwin; and Kurt R. Grebe

It is certified that error appears in the above-identified patent and that said Letters Patent are hereby corrected as shown below:

Col. 3, line 33, change "glyptol" to -- glyptal --

Col. 3, line 34, change "A-20" to -- A-120 --

Col. 3, line 45, after "device." add the following sentences: -- Since the mix includes ether which evaporates rapidly, it is preferable to use it as soon as possible in order to maintain the proper solvent ratio. However, if the mix is cooled, it may be stored and used at a later time. --

Col. 3, line 53, change "0.25" to -- 0.025 --

Col. 3, line 53, change "0.15" to -- 0.015 --

Col. 3, line 54, after "inches." add the following sentence: -- No support is necessary while the tubular member is exiting from the extrusion press or subsequent air-curing provided that unreasonable lengths are not used. --

Col. 4, line 8, change "glyptol" to -- glyptal --

Col. 4, line 10, change "12, 14 and 15" to -- 13, 14 and 15 --

Col. 5, line 10, after "extruded" delete the comma

Signed and sealed this 9th day of March 1971.

(SEAL)
Attest:

Edward M. Fletcher, Jr.
Attesting Officer

WILLIAM E. SCHUYLER, JR.
Commissioner of Patents